United States Patent [19]
Brown et al.

[11] Patent Number: 5,831,995
[45] Date of Patent: Nov. 3, 1998

[54] ARRANGEMENT FOR GENERATING COMMAND SEQUENCES USING ORTHOGONAL ARRAYS

[75] Inventors: Philip E. Brown, Westfield; Pramod Warty, Freehold, both of N.J.

[73] Assignee: Lucent Technologies Inc., Murray Hill, N.J.

[21] Appl. No.: 547,098

[22] Filed: Oct. 23, 1995

[51] Int. Cl.$^6$ ..................................................... G01R 31/28
[52] U.S. Cl. ........................................... 371/27.1; 364/580
[58] Field of Search ........................... 371/27, 27.1, 21.2, 371/27.2; 364/580, 284.4, 148, 413.16, 402; 395/200, 284.3, 421.07

[56] References Cited

U.S. PATENT DOCUMENTS 5,159,600  10/1992  Chintapalli et al. ...................... 371/27

*Primary Examiner*—Robert W. Beausoliel, Jr.
*Assistant Examiner*—Nadeem Iqbal
*Attorney, Agent, or Firm*—Frederick B. Luludis

[57] ABSTRACT

The testing of a series of commands is enhanced using a multilevel approach that employs orthogonal arrays within orthogonal arrays. Specifically, an Orthogonal Array (OA) is applied within each operation and then re-applied across the different operations. Thus, the process initially applies an OA to an intra-operation covering the different combinations of command parameters associated with an operation. The process applies an OA to an inter-operations OA covering the combinations of all command parameters.

4 Claims, 7 Drawing Sheets

FIG. 1

| | $P_{11}$ | $P_{12}$ | $P_{13}$ | 25-1 |
|---|---|---|---|---|
| 1 | 1 | 1 | 1 | |
| 2 | 1 | 2 | 2 | |
| 3 | 2 | 1 | 2 | |
| 4 | 2 | 2 | 1 | |

| | $P_{21}$ | $P_{22}$ | $P_{23}$ | 25-2 |
|---|---|---|---|---|
| 1 | 1 | 1 | 1 | |
| 2 | 1 | 2 | 2 | |
| 3 | 2 | 1 | 2 | |
| 4 | 2 | 2 | 1 | |

| | $P_{31}$ | $P_{32}$ | $P_{33}$ | 25-3 |
|---|---|---|---|---|
| 1 | 1 | 1 | 1 | |
| 2 | 1 | 2 | 2 | |
| 3 | 2 | 1 | 2 | |
| 4 | 2 | 2 | 1 | |

| | $P_{41}$ | $P_{42}$ | $P_{43}$ | 25-4 |
|---|---|---|---|---|
| 1 | 1 | 1 | 1 | |
| 2 | 1 | 2 | 2 | |
| 3 | 2 | 1 | 2 | |
| 4 | 2 | 2 | 1 | |

FIG. 2

L₁₆ ORTHOGONAL ARRAY

| ROW | | | | | |
|---|---|---|---|---|---|
| 1 | 1 | 1 | 1 | 1 | 1 |
| 2 | 1 | 2 | 2 | 2 | 2 |
| 3 | 1 | 3 | 3 | 3 | 3 |
| 4 | 1 | 4 | 4 | 4 | 4 |
| 5 | 2 | 1 | 2 | 3 | 4 |
| 6 | 2 | 2 | 1 | 4 | 3 |
| 7 | 2 | 3 | 4 | 1 | 2 |
| 8 | 2 | 4 | 3 | 2 | 1 |
| 9 | 3 | 1 | 3 | 4 | 2 |
| 10 | 3 | 2 | 4 | 3 | 1 |
| 11 | 3 | 3 | 1 | 2 | 4 |
| 12 | 3 | 4 | 2 | 1 | 3 |
| 13 | 4 | 1 | 4 | 2 | 3 |
| 14 | 4 | 2 | 3 | 1 | 4 |
| 15 | 4 | 3 | 2 | 4 | 1 |
| 16 | 4 | 4 | 1 | 3 | 2 |

| | Opr₁ | | | Opr₂ | | | Opr₃ | | | Opr₄ | | |
|---|---|---|---|---|---|---|---|---|---|---|---|---|
| | $P_{11}$ | $P_{12}$ | $P_{13}$ | $P_{21}$ | $P_{22}$ | $P_{23}$ | $P_{31}$ | $P_{32}$ | $P_{33}$ | $P_{41}$ | $P_{42}$ | $P_{43}$ |
| 1 | 1 | 1 | 1 | 1 | 1 | 1 | 1 | 1 | 1 | 1 | 1 | 1 |
| 2 | 1 | 1 | 1 | 1 | 2 | 2 | 1 | 2 | 2 | 1 | 2 | 2 |
| 3 | 1 | 1 | 1 | 2 | 1 | 2 | 2 | 1 | 2 | 2 | 1 | 2 |
| 4 | 1 | 1 | 1 | 2 | 2 | 1 | 2 | 2 | 1 | 2 | 2 | 1 |
| 5 | 1 | 2 | 2 | 1 | 1 | 1 | 1 | 2 | 2 | 2 | 1 | 2 |
| 6 | 1 | 2 | 2 | 1 | 2 | 2 | 1 | 1 | 1 | 2 | 2 | 1 |
| 7 | 1 | 2 | 2 | 2 | 1 | 2 | 2 | 2 | 1 | 1 | 1 | 1 |
| 8 | 1 | 2 | 2 | 2 | 2 | 1 | 2 | 1 | 2 | 1 | 2 | 2 |
| 9 | 2 | 1 | 2 | 1 | 1 | 1 | 2 | 1 | 2 | 2 | 2 | 1 |
| 10 | 2 | 1 | 2 | 1 | 2 | 2 | 2 | 2 | 1 | 2 | 1 | 2 |
| 11 | 2 | 1 | 2 | 2 | 1 | 2 | 1 | 1 | 1 | 1 | 2 | 2 |
| 12 | 2 | 1 | 2 | 2 | 2 | 1 | 1 | 2 | 2 | 1 | 1 | 1 |
| 13 | 2 | 2 | 1 | 1 | 1 | 1 | 2 | 2 | 1 | 1 | 2 | 2 |
| 14 | 2 | 2 | 1 | 1 | 2 | 2 | 2 | 1 | 2 | 1 | 1 | 1 |
| 15 | 2 | 2 | 1 | 2 | 1 | 2 | 1 | 2 | 2 | 2 | 2 | 1 |
| 16 | 2 | 2 | 1 | 2 | 1 | 2 | 1 | 1 | 1 | 2 | 1 | 2 |

$L_{16}(4^5)$ — rows; $cmd_1$, $cmd_2$, $cmd_3$, $cmd_4$ — column groups; table labeled 50.

FIG. 5

```
> OATS
> command
>         name    Cmd1
>         type    main
> parameter
>         name    Cmd1Parm1
>         order   1
>         levels
>                 0       1
>                 1       2
> parameter
>         name    Cmd1Parm2
>         order   2
>         levels
>                 0       1
>                 1       2
> parameter
>         name    Cmd1Parm3
>         order   3
>         levels
>                 0       1
>                 1       2
  ⋮       ⋮       ⋮       ⋮
> command
>         name    Cmd4
>         type    main
> parameter
>         name    Cmd4Parm1
>         order   1
>         levels
>                 0       1
>                 1       2
> parameter
>         name    Cmd4Parm2
>         order   2
>         levels
>                 0       1
>                 1       2
> parameter
>         name    Cmd4Parm3
>         order   3
>         levels
>                 0       1
>                 1       2
```

FIG. 6

| # TEST CASE 1 | # TEST CASE 2 | # TEST CASE 3 | # TEST CASE 4 | # TEST CASE 5 | ... | # TEST CASE 16 |
|---|---|---|---|---|---|---|
| #SCENARIO 1 | #SCENARIO 1 | #SCENARIO 1 | #SCENARIO 1 | #SCENARIO 1 | ... | #SCENARIO 1 |
| cmd1  1 1 1 | cmd1  1 1 1 | cmd1  1 1 1 | cmd1  1 1 1 | cmd1  1 2 2 | ... | cmd1  2 2 1 |
| cmd2  1 1 1 | cmd2  1 2 2 | cmd2  2 1 2 | cmd2  2 2 1 | cmd2  1 1 1 | ... | cmd2  2 2 1 |
| cmd3  1 1 1 | cmd3  1 2 2 | cmd3  2 1 2 | cmd3  2 2 1 | cmd3  1 2 2 | ... | cmd3  1 1 1 |
| cmd4  1 1 1 | cmd4  1 2 2 | cmd4  2 1 2 | cmd4  2 2 1 | cmd4  2 1 2 | ... | cmd4  2 1 2 |
| #SCENARIO 2 | #SCENARIO 2 | #SCENARIO 2 | #SCENARIO 2 | #SCENARIO 2 | ... | #SCENARIO 2 |
| cmd2  1 1 1 | cmd2  1 2 2 | cmd2  2 1 2 | cmd2  2 2 1 | cmd2  1 1 1 | ... | cmd2  2 2 1 |
| cmd4  1 1 1 | cmd4  1 2 2 | cmd4  2 1 2 | cmd4  2 2 1 | cmd4  2 1 2 | ... | cmd4  2 1 2 |
| cmd1  1 1 1 | cmd1  1 1 1 | cmd1  1 1 1 | cmd1  1 1 1 | cmd1  1 2 2 | ... | cmd1  2 2 1 |
| cmd3  1 1 1 | cmd3  1 2 2 | cmd3  2 1 2 | cmd3  2 2 1 | cmd3  1 2 2 | ... | cmd3  1 1 1 |
| #SCENARIO 3 | #SCENARIO 3 | #SCENARIO 3 | #SCENARIO 3 | #SCENARIO 3 | ... | #SCENARIO 3 |
| cmd4  1 1 1 | cmd4  1 2 2 | cmd4  2 1 2 | cmd4  2 2 1 | cmd4  2 1 2 | ... | cmd4  2 1 2 |
| cmd3  1 1 1 | cmd3  1 2 2 | cmd3  2 1 2 | cmd3  2 2 1 | cmd3  1 2 2 | ... | cmd3  1 1 1 |
| cmd2  1 1 1 | cmd2  1 2 2 | cmd2  2 1 2 | cmd2  2 2 1 | cmd2  1 1 1 | ... | cmd2  2 2 1 |
| cmd1  1 1 1 | cmd1  1 1 1 | cmd1  1 1 1 | cmd1  1 1 1 | cmd1  1 2 2 | ... | cmd1  2 2 1 |
| #SCENARIO 4 | #SCENARIO 4 | #SCENARIO 4 | #SCENARIO 4 | #SCENARIO 4 | ... | #SCENARIO 4 |
| cmd3  1 1 1 | cmd3  1 2 2 | cmd3  2 1 2 | cmd3  2 2 1 | cmd3  1 2 2 | ... | cmd3  1 1 1 |
| cmd1  1 1 1 | cmd1  1 1 1 | cmd1  1 1 1 | cmd1  1 1 1 | cmd1  1 2 2 | ... | cmd1  2 2 1 |
| cmd4  1 1 1 | cmd4  1 2 2 | cmd4  2 1 2 | cmd4  2 2 1 | cmd4  2 1 2 | ... | cmd4  2 1 2 |
| cmd2  1 1 1 | cmd2  1 2 2 | cmd2  2 1 2 | cmd2  2 2 1 | cmd2  1 1 1 | ... | cmd2  2 2 1 |

ARRANGEMENT FOR GENERATING COMMAND SEQUENCES USING ORTHOGONAL ARRAYS

FIELD OF THE INVENTION

The invention relates to generating test cases to test a set of commands, and particularly relates to using orthogonal arrays to generate the test cases.

BACKGROUND OF THE INVENTION

One important aspect of testing a particular system function, e.g., a computer function, is the order in which a set of commands characterizing the function should be executed. For example, if the set is composed of I commands, i=1, 2, ..., I, (Cmd, $Cmd_2$, ..., $Cmd_i$), then the number of different sequences of such commands would be equal to I factorials (I!). Any problem that may arise as a result of such testing could be compounded by the number of parameters associated with each command that will be executed. That is, if the number of such commands equals four (I=4) and each command has three ($n_i$=3) parameters ($P_{ij}$) in which each parameter may assume either of two settings ($m_{ij}$=2), then each command has 23=8 possible parameter combinations. Moreover, since there are four different commands, then the number of different command/parameter combinations equals 84=4,096. Also, considering that the four commands may provide different combinations of command scenarios, then there will be 4!*4096=98,304 different scenarios of commands, in which each command scenario represents a specific sequence of commands that may be executed with particular parameter settings.

It may be appreciated from the foregoing that it would be very time consuming and labor intensive to test each of the 98,304 command scenarios to determine which scenarios are the most effective.

SUMMARY OF THE INVENTION

The foregoing problem is dealt with using a multilevel approach that employs, in accord with an aspect of the invention, orthogonal arrays within orthogonal arrays. Specifically, we apply an Orthogonal Array (hereinafter, also OA) within each operation and then apply an OA across the different operations (commands). The process thus applies an OA to an intra-operation to obtain the different combinations of command parameters associated with an operation, and then applies an OA to an inter-operations process covering the combinations of all command parameters.

This and other aspects of the invention will become apparent from the following detailed description and drawings.

BRIEF DESCRIPTION OF THE DRAWINGS

In the drawing:

FIG. 1 illustrates the use of orthogonal arrays at a first level operation (intra-operation) in the generating of a reduced set of command sequences;

FIG. 2 is an example of one example of an orthogonal array that may be used in the inter-operation of generating a reduced set of command sequences;

FIG. 5 illustrates one way in which a user may enter commands in the system of FIG. 4;

FIG. 6 illustrates the command sequences that are generated, in accord with the principles of invention, for a particular set of commands each having a predetermined number of parameters.

DETAILED DESCRIPTION

An illustrative embodiment of the claimed invention will be discussed in the context of an arbitrary set of commands $Cmd_1$, $Cmd_2$, $Cmd_3$ and $Cmd_4$ respectively corresponding to a particular function, for example, a telecommunications network operations system function such as alarm monitoring, including alarm alerting, alarm processing and retrieving archived alarms, etc. However, it is to be understood that the invention is equally applicable to a case involving a different function characterized by either more or less commands as it will be readily appreciated from the following.

Accordingly, for each command $Cmd_i$ having $n_i$ number of parameters, with each parameter, $P_{ij}$, taking on mij settings (or levels), an orthogonal array may be specified to generate an appropriate number of test cases that cover the different combinations of parameters associated with a particular $Cmd_i$. For example, if $n_i$=3 (i.e., 3 parameters), and $m_{ij}$=2 (i.e., each parameter has 2 settings), then the well-known $L_4$ ($2^3$) orthogonal array may be selected in a conventional manner to specify four different parameter combinations for $Cmd_i$ as shown, for example, for array 25-1 in FIG. 1. Assuming for the sake of clarity and simplicity that the same number of parameters and settings (e.g., 3, 2) are applicable to the four parameter combinations, then the $L_4$ array may be used to generate operational profiles for each of the four operations which is defined herein as an intra-operation application, as shown in FIG. 1, since it relates to the derivation of parameter combinations for individual commands.

It is seen from the FIG. that OAs 25-1 through 25-4 are identical, which is the result of assuming that each command has the same number of parameters and settings. It is also seen from that FIG. that $Cmd_1$ through $Cmd_4$ each have 4 parameter combinations resulting from their OAs. In FIG. 1, each row of the intra-command OA maps to a specific parameter settings associated with $Cmd_i$.

Following the completion of the foregoing intra-command process, an inter-command process is invoked to select an Orthogonal Array (OA) to generate so-called inter-command combinations (i.e., different combinations of command parameter combinations). Thus, the results of applying OAs during the intra-command process are used to specify the OA during the inter-command process.

Figures 3, 4:
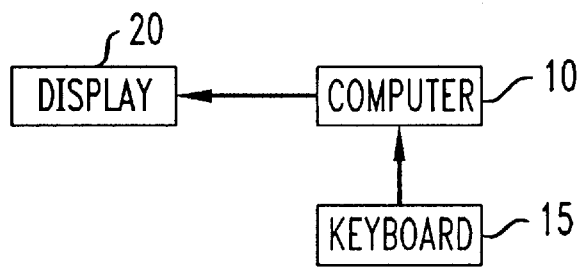
FIG. 3 is an example of employing the orthogonal arrays of FIG. 1 in the orthogonal array of FIG. 2.
FIG. 4 shows a computer system in which the principles of the invention may be practiced.

To apply an OA to inter-commands, a system function is defined by I commands, i=1,2, ..., I, such that each $Cmd_i$ corresponds to a parameter, $P_i$, with $m_i$ distinct levels, reflecting different command parameter combinations. These $m_i$ parameter combinations for $Cmd_i$ come from the rows of each $Cmd_i$'s intraoperation OA as illustrated in FIG. 1. In the above illustrative example with I=4 commands, OAs 25-1 through 25-4 indicate $m_i$=4 intra-command parameter combinations for all I=4 commands. Then, as shown by way of FIG. 2, a single inter-command OA, a so-called $L_{16}$ ($4^5$) OA, is selected, in a conventional manner, to specify all pairwise combinations of factor settings for 4 factors (commands $Cmd_1$, $Cmd_2$, $Cmd_3$ $Cmd_4$) with 4 levels each. This $L_{16}$ ($4^5$) inter-command OA indicates 16 different combinations of command parameter combination may be obtained as illustrated in FIG. 3. (Note that although this $L_{16}$ ($4^5$) array supports more than the needed number of parameters (i.e., it includes more columns than needed, the unneeded columns may be removed from the array, and, as is well-known, the array will still continue to be an Orthogonal Array.) In particular, FIG. 3 illustrates that the testing of an illustrative operations system functionality (e.g., alarm monitoring) may be reduced from 4096 tests to 16 tests.

Although the foregoing appears to be somewhat complex, all that a user needs to do to achieve similar results is to identify the (a) commands that need to be tested, (b) number of parameters associated with each such command and (c) number of levels of each such parameter and then supply the identified information to the system of FIG. 4.

Turning then to FIG. 4, computer 10 is arranged to automatically select the appropriate orthogonal arrays for the test information that a user enters via terminal keyboard 15. Computer 10 then generates the command permutations and applies the permutation to the contents of the orthogonal array selected for the inter-operation process to identify/output the most effective command scenarios. In an illustrative embodiment of the invention, computer 10 may be, for example, the HP 9000/860 computer available from the Hewlett-Packard company and operating under the well-known UNIX operating system. Alternatively, computer 10 may be a personal computer or a workstation.

To enter the identified commands, the user first invokes a command processing tool which runs on computer 10. The user may do this by entering via keyboard 15 a command identifying the tool, the command being, for example, OATS (i.e., Orthogonal Array Test System). The user may then proceed to enter (a) each command that will form the various scenarios, (b) the parameters associated with the entered command, and (c) the levels for each such parameter, as shown in FIG. 5 for the above case of four commands.

Specifically, the user enters the term "command" followed by a "carriage return". At the next prompt, the user enters a "tab" (represented by the solid line) followed by "name" followed by a "tab" and then by the name of the command. The user then enters a carriage return. At the next prompt (>) the user identifies the command type by entering a "tab" and then the word "type" followed by another "tab" and then the word "main" to identify the command type. The user then enters a "carriage return" to then specify the parameters for the identified command at the next prompt. The user does this by entering the term "parameter" followed by a "carriage return". The user then enters a "tab" at the next prompt followed by the word "name". The user then enters another "tab" and then the name of the command followed by "carriage return", as shown for first parameter associated with $Cmd_1$. The user then enters the order and levels associated with the identified parameter. As mentioned above, it is assumed that each such parameter has two levels of values at each level.

In particular, at the next prompt, the user enters a "tab" followed by the word "order" followed by another "tab" and then a numeral, e.g., a one, to denote the command's jth parameter number, as shown in the FIG. The user then enters by a "carriage return". At the next prompt, the user enters a "tab", then the word "levels" and then a "carriage return". At the next prompt, and for the first level, the user enters a "tab" followed by another "tab" followed by the first value of the level (starting at "0") followed by a tab followed by the second value (a one) for the specified level. The user then enters a "carriage return" to complete the entering of the first parameter associated with the first command. The user proceeds in a similar manner to enter the remaining parameters associated with the first command and to enter the remaining commands and their associated parameters and parameter levels, as represented in the FIG. for the entries for $Cmd_4$.

Next consider the problem in which command scenarios (permutations) need to be selected for the commands whose command parameter combinations are specified by the intra-operation OAs illustrated in FIG. 1. That is, for I commands, there is a need to select (identify) the least number of command permutations that cover all possible contiguous pairs of commands. For example, if there were only one command, $Cmd_1$, then there are no command pairs and the only command scenario would also be ($Cmd_1$). Additionally, if there were only two commands, Cmd1 and $Cmd_2$, then the only command pairs (and the only command scenarios) would be ($Cmd_1$, $Cmd_2$), and ($Cmd_2$, $Cmd_1$). In all other cases, there will be an even number of command permutations based on the number of commands (either I or I+1). Therefore, if there are four commands, $Cmd_1$, $Cmd_2$, Cmd3 and $Cmd_4$ (as noted above), then there will also be four command permutations. These permutations must cover all possible command pairs, as shown by the following combinations.

($Cmd_1$ $Cmd_2$) ($Cmd_2$ $Cmd_3$) ($Cmd_3$ $Cmd_4$) ($Cmd_4$ $Cmd_1$)
($Cmd_1$ $Cmd_3$) ($Cmd_2$ $Cmd_4$) ($Cmd_3$ $Cmd_1$) ($Cmd_4$ $Cmd_2$)
($Cmd_1$ $Cmd_4$) ($Cmd_2$ $Cmd_1$) ($Cmd_3$ $Cmd_2$) ($Cmd_4$ $Cmd_3$)
Since the first permutation will simply be:

($Cmd_1$ $Cmd_2$ $Cmd_3$ $Cmd_4$)
then the second permutation is obtained by splitting the first permutation into two halves, as follows:

($Cmd_1$ $Cmd_2$) ($Cmd_3$ $Cmd_4$)
Commands are then alternately selected from each half of the above, starting with the last command in each half and working backwards as follows:

($Cmd_2$ $Cmd_4$ $Cmd_1$ $Cmd_3$)
This process is continued until the following four permutations are constructed:

($Cmd_1$ $Cmd_2$ $Cmd_3$ $Cmd_4$)
($Cmd_2$ $Cmd_4$ $Cmd_1$ $Cmd_3$)
($Cmd_4$ $Cmd_3$ $Cmd_2$ $Cmd_1$)
($Cmd_3$ $Cmd_1$ $Cmd_4$ $Cmd_2$)

Note that, when there are only three commands, the same set of four command permutations would be created. However, since the fourth command in the permutations would not exist, it is ignored, ostensibly yielding a set of command permutations that would be viewed as follows:

($Cmd_1$ $Cmd_2$ $Cmd_3$)
($Cmd_2$ $Cmd_1$ $Cmd_3$)
($Cmd_3$ $Cmd_2$ $Cmd_1$)
($Cmd_3$ $Cmd_1$ $Cmd_2$)
which covers the following possible command pairs:

($Cmd_1$ $Cmd_2$) ($Cmd_2$ $Cmd_3$) ($Cmd_3$ $Cmd_1$)
($Cmd_1$ $Cmd_3$) ($Cmd_2$ $Cmd_1$) ($Cmd_3$ $Cmd_2$)

The final step in the overall process is to apply the command permutations to the selected inter-command orthogonal array to effectively reduce the number of command scenarios that need to be tested, and thus greatly increase the efficiency of the testing procedure. The resulting command scenarios are shown in FIG. 6 and are generated by applying each of the above four command permutations to each row or combination of command parameter combinations specified by the inter-command OA shown in FIG. 3. For example, it is seen from the illustrative example of FIG. 6, that test case 1 includes four scenarios respectively formed from the contents of row 1 of OA 50 and each of the four permutations. Similarly, test case 2 also includes four scenarios respectively formed from the contents of row 2 of OA 50 and each of the four permutations, and so on for rows 3 through 15 and ending in test case 16 which similarly includes four scenarios respectively formed from the contents of row 16 of OA 50 and each of the four permutations.

Once the user has completed the foregoing, computer 10, in accord with the program that implements the inventive tool therein (discussed below), parses the user's input and converts it into an internal representation suitable for determining which of a plurality of OAs forming a library is most optimally suited for generating the reduced set of command scenarios (sequences). Selection of optimal OA may be done in accord with the teaching of U.S. Pat. No. 5,159,600 issued Oct. 27, 1992 to A. P. Chintapalli et al, which is incorporated herein by reference. Computer 10, using the entered commands, associated parameter names as well as the level specified for those parameters assigns factors to the selected OAs. The computer 10 tool, then, in the manner discussed above, (a) generates a reduced set of command permutations satisfying the contiguous pairwise property, (b) generates the parameter combinations for each individual command based on a selected intra-operation OA, (c) redefines the number of levels (settings) for each command equal to the number of parameter combinations generated by the intra-command OA for that command, and (d) during the inter-command process, applies a final OA to generate combinations of command parameter combinations. For each commands (command scenarios) are also indicated. This is illustrated in FIG. 4 which shows the reduced set of command scenarios that the computer 10 tool generates and outputs for display on display 20, as discussed above.

Figure 7:
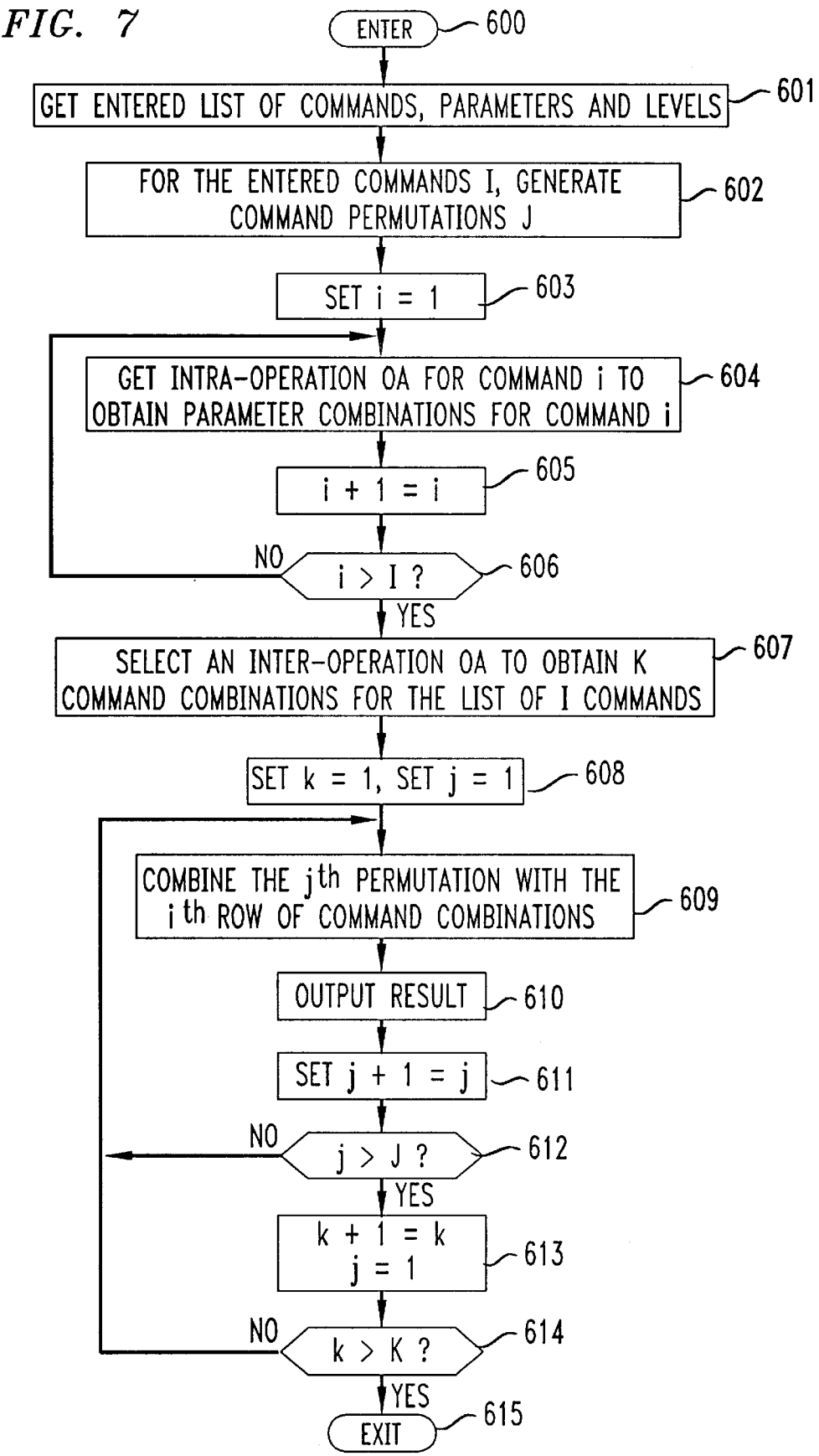
FIGS. 7 and 8 illustrate in flow chart form the program which implements the principles of the invention in the system of FIG. 4.

The program which implements the principles of the invention in computer 10 is illustrated in FIG. 7. Specifically, the program is entered responsive to the user having entered a list of commands, parameters for each command and the number of levels for each such parameter. The program (block 602) obtains the list and then (block 602) generates, in the manner discussed above, the minimum set of J command permutations that cover all possible contiguous command pairs. The program (block 603) then sets a variable i to a value of one and then enters a loop to perform the intra-command process. In particular, for each command in the list, the program (block 604) selects, in a conventional manner, an intra-command OA for the command to generate a minimum set of command i parameter combinations that cover, in a pairwise fashion, combinations of the parameters for that command, i.e., command I. The program (block 605) increments the variable i and then (block 606) checks to see if it has completed the intra-command process for all of the entered commands. If not, then the program processes the next command (block 604). If so, then the program (block 607) begins the inter-command processing. Specifically, the program (block 607) selects, in a conventional manner, an OA that may be used to generate the minimal number, K, of combinations of command parameter combinations that provide pairwise coverage of the parameter combinations settings selected for the entered commands.

Following the foregoing, for each combination of commands parameter combinations specified by the inter-command OA, the program applies each permutation of commands. The program (block 608) then sets each of the variables k and j to a value of one and then begins (blocks 609, 610, 611 and 612) combining each of the j permutations with a particular (row) combination of command parameter combinations specified by the inter-command OA. In doing so, the program outputs (e.g., FIG. 4) each such result (block 610) and then increments j (block 611). The program continues forming such combinations until the value of j exceed the value of J (block 612). At that point, the program (block 613) increments k and initializes j, and returns to forming the next combination (row) of command parameter combinations with each permutation j if the value of k does not exceed K (block 614). Otherwise, the program exits (block 615) as a result of having completed its task.

Figure 8:
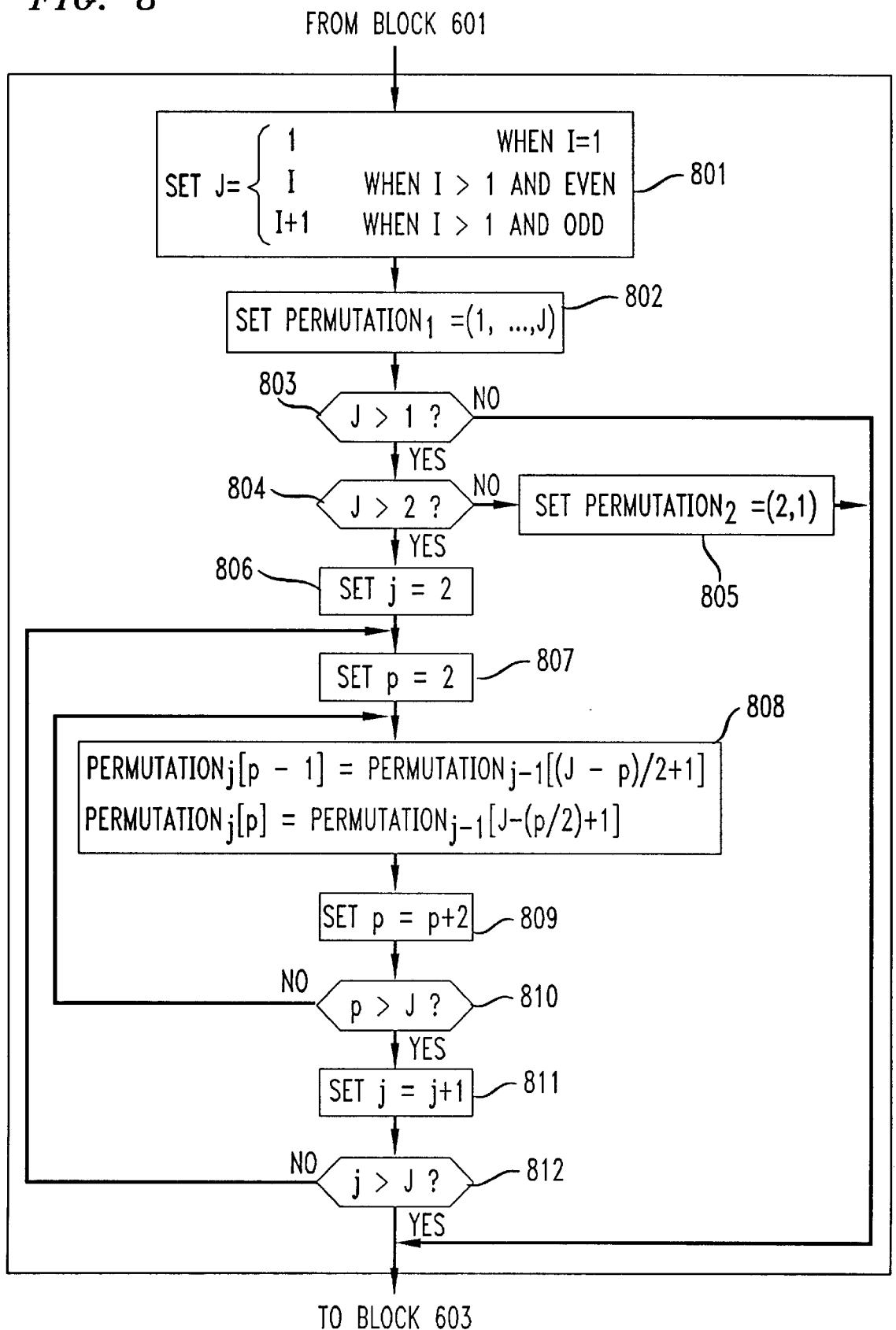

An expanded version of block 602 is illustrated in FIG. 8. Specifically, the minimum number of command permutations, J, is determined (block 801). If the number of commands, I, is an even number, or is equal to one, then the number of command permutations, J, will be equal to I. Otherwise, J will equal I+1. The program then sets the first permutation to the ascending sequence of integers starting with one and ending with J (block 802). If there is only one command permutation (block 803), then the program proceeds to block 603. Otherwise, if there are only two command permutations (block 804), then the program sets the second permutation to the descending sequence of integers starting with two and ending with one (block 805), and then exits by proceeding to block 603.

In all other cases, the program iterates over the command permutations one at a time starting with the second permutation, j=2 (blocks 806 through 812). Each of these command permutations contains an even number of integers and is generated from the previous command permutation. Within each command permutation, the program iterates over the elements of the permutation two at a time starting with the first two elements, p=2 (blocks 807 through 810). The first element of the second permutation is set to the value of the last element of the first half of the first permutation, whereas the second element of the second permutation is set to the value of the last element of the second half of the first permutation (block 808). The program proceeds to the next two elements in the permutation, p=4 (block 809) since J is not less than four (block 810). The third element of the second permutation is set to the value of the next-to-last element of the first half of the first permutation, whereas the fourth element of the second permutation is set to the value of the next-to-last element of the second half of the first permutation (block 808 again). This iteration over elements continues until the second permutation is completed. At this point, p is incremented by two (block 809) and is now greater than J (block 810). The program proceeds to the third command permutation, j=3 (block 811). Each ensuing permutation is constructed in the same manner as the second permutation. Once the last permutation is built, j is incremented by one (block 811) and is now greater than J (block 812). The program then exits to block 603.

The foregoing is merely illustrative of the principles of the invention. Those skilled in the art will be able to devise numerous arrangements, which, although not explicitly shown or described herein, nevertheless embody those principles that are within the spirit and scope of the invention.

The invention claimed is:

1. A method of generating a plurality of different combinations of a plurality of computer commands characterizing a predetermined function, each of said commands having a respective number of parameters, each of said parameters having a respective number of levels, said plurality of different combinations being the most effective combinations of all of the combinations that may be obtained from executing said commands and their associated parameters, said method comprising the steps of

- selecting an intra-operation orthogonal array for each of said commands and its associated parameters and mapping said associated parameters and their respective levels into combinations specified by the mapping of the selected intra-operation orthogonal array,
- selecting an inter-operation array that is optimum for mapping the contents of each said intra-operation orthogonal array into different combinations of the parameters respectively associated with said commands and performing said mapping,
- generating a minimum number of combinations of said commands covering all pair-wise combinations of said commands, and
- combining and outputting each combination specified by a respective row of said inter-operation orthogonal array with each of said generated combinations of commands.

2. A method of generating a minimum set of combinations of commands effectively covering all combinations of said commands, each of said commands being associated with a predetermined number of parameters each having at least two levels, said method comprising the steps of

- receiving said commands and associated parameters and parameter levels as they are entered by a user,
- for each received command, processing the associated parameters and their respective levels to generate a first set of a minimum number of combinations that effectively cover all test cases that may be generated from all combinations of the associated parameters and levels,
- processing each said first set of combinations to generate a second set of a minimum number of combinations of all of said parameters and their respective levels that effectively covers all combinations that may be obtained from said all of said parameters and their respective levels,
- generating a minimum number of combinations of said commands covering all pair-wise combinations of said commands, and
- combining and outputting each of the combinations specified by said second set of combinations with each of said combinations of said commands.

3. The method of claim 2 wherein said step of processing to generate a first set of a minimum number of combinations includes the step of selecting an orthogonal array optimally suited for identifying said minimum number of combinations.

4. The method of claim 2 wherein said step of processing to generate a second set of a minimum number of combinations includes the step of selecting an orthogonal array optimally suited for identifying said minimum number of combinations of all of said parameters.

* * * * *